(12) United States Patent
Kim

(10) Patent No.: US 8,159,704 B2
(45) Date of Patent: Apr. 17, 2012

(54) RECEPTION METHOD FOR ONLINE PRINT ORDERING SYSTEM

(76) Inventor: Jung Ho Kim, Seoul (KR)

( * ) Notice: Subject to any disclaimer, the term of this patent is extended or adjusted under 35 U.S.C. 154(b) by 1002 days.

(21) Appl. No.: 12/153,494

(22) Filed: May 20, 2008

(65) Prior Publication Data
US 2009/0290188 A1     Nov. 26, 2009

(51) Int. Cl.
*G06F 3/12* (2006.01)
*G06F 15/00* (2006.01)

(52) U.S. Cl. ........................... 358/1.15; 358/1.1

(58) Field of Classification Search ............... 358/1.1, 358/1.15
See application file for complete search history.

(56) References Cited

FOREIGN PATENT DOCUMENTS
KR       10-0607845        11/2005

*Primary Examiner* — Benny Tieu
*Assistant Examiner* — Eric A Rust
(74) *Attorney, Agent, or Firm* — Jacobson Holman PLLC (57) ABSTRACT

Disclosed herein is a reception method for an online print ordering system. In the reception method, the case in which a single image file includes various types of print entities is determined to be normal and then composition files are enabled to be created for the respective entities, thereby improving the efficiency of the print ordering system and customers' convenience of use.

2 Claims, 12 Drawing Sheets

RECEPTION METHOD FOR ONLINE PRINT ORDERING SYSTEM

BACKGROUND OF THE INVENTION

1. Field of the Invention

The present invention relates generally to a reception method for an online print ordering system, and, more particularly, to an apparatus and method for an online print ordering system, which are capable of automatically performing a process of automatically examining whether print information, submitted over the Internet, is defective, converting the print information into data in the state in which the composition work of arranging the data on an imposition plate can be performed, and storing the data.

2. Description of the Related Art

A print ordering system, proposed by the present applicant in the preceding Korean Patent No. 607845, includes a web server for connecting to customers' computers over the Internet and receiving order information; a reception computer for receiving the order information from the web server, opening each image file included in the order information, examining the image file for defects, and correcting the image file; an item-based server for, if there is no defect in the image file when the reception computer examines the corrected image file, converting a plurality of image entities, included in the image file, into composition files and then storing the composition files; and an application server for providing the order information of the web server to the reception computer, performing the composition work of arranging the composition files, stored in the item-based server, on an imposition plate, and, if there is information about the completion of composition, completing the imposition plate, and assigning an imposition plate file name corresponding to a lot number and, simultaneously, providing work instruction information to computers for respective work parts.

Since, in the above-described print ordering system, a process of storing image files for respective items according to the type of print and converting print entities, included in each image file, into composition files is performed, order information related to the case in which a customer includes various types of print entities in a single image file and places an order using the image file is classified as defective order information.

In this case, there is a problem in that the operator of the reception computer must select the defective order information, open the image file, check the sizes of the entities, and create new image files for respective print items. This problem, which occurs frequently in the reception process, acts as a primary factor that deteriorates the efficiency of the print ordering system.

In order to solve the problem, when an order related to the case in which a customer provides various types of print entities in a single image file is processed as an erroneous order, the customer suffers inconvenience in that he or she must correct the image file so that the same type of print entities are included in each image file and then place a new order through the print ordering system, or otherwise contacts another printing company.

SUMMARY OF THE INVENTION

Accordingly, the present invention has been made keeping in mind the above problems occurring in the prior art, and an object of the present invention is to provide a reception method for an online print ordering system, in which the case in which a single image file includes various types of print entities is determined to be normal and then composition files are enabled to be created for the respective entities, thereby improving the efficiency of the print ordering system and customers' convenience of use.

In order to accomplish the above object, the present invention provides a reception method for an online print ordering system, including a preliminary reception step of storing new order information when there is new order information; step 1 of, if an image file, included in the stored order information, has a registered extension, an item related to postprocessing is not included in the order information and a text editing font of the image file has been smoothed, determining that the order information stored at the preliminary reception step is automatically receivable order information; step 2 of determining whether a print entity to be selected from among print entities included in the image file is related to a double-sided print; step 3 of running a program corresponding to the extension of the image file, opening the image file in a first page, releasing the group designation of all entities, selecting all the entities for a first group, changing the size of a first document to that of the selected first group, and placing the first document at the center thereof; step 4 of releasing the designation for the first group, selecting a print entity on the upper left side of a second document, and determining whether a size of the second document is equal to that of an ordered print; step 5-1 of, if the print entity is determined to be related to a single-sided print at step 3 and the size of the selected print entity is equal to that of an ordered print, placing the print entity, selected at step 4, at a center of a newly inserted second page, storing the print entity in a composition file, and deleting the second page; step 5-2 of, if the selected print entity is determined to be related to a double-sided print at step 3 and the size of the selected print entity is equal to that of the ordered print, placing the print entity, selected at step 4, in an upper left corner of the second document, selecting a print entity on the upper right side of the second document, placing the latter print entity on an upper right corner of the second document, placing a second group, for which the two double-sided print entities, placed at an upper end of the second document, are selected, at a center of a newly inserted second page, and storing the left print entity in a front side composition file and the right print entity in a back side composition file and, simultaneously, deleting the second page; and step 6 of, if any print entity to be processed remains in the first page, repeating step 2 and steps subsequent thereto, and, when all of the print entities of the first page are stored in composition files, providing a reception completion notice to a relevant customer's computer over the Internet.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

Preferred embodiments of the present invention will be described in detail below with reference to the accompanying drawings.

Figure 1:
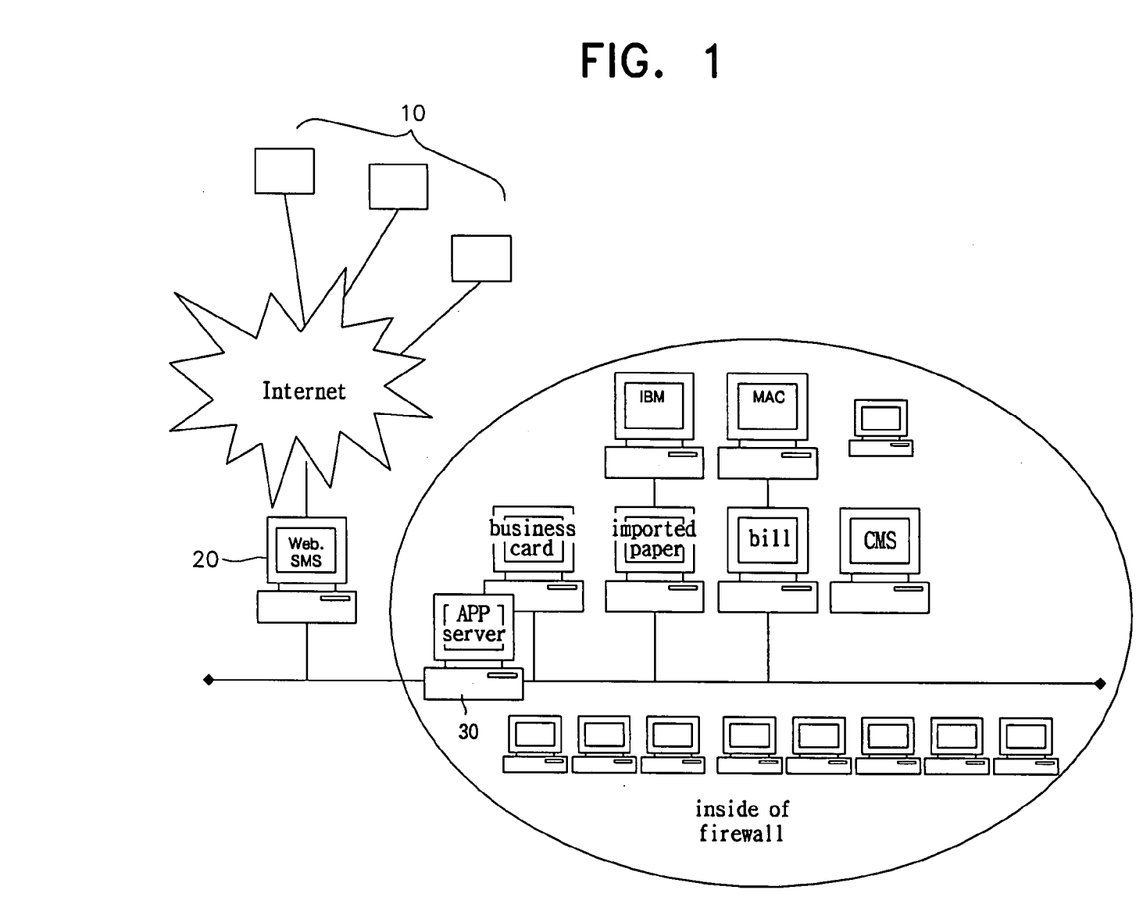
FIG. 1 is a schematic diagram showing a system according to the present invention.

FIG. 1 is a diagram showing an online print ordering system according to an embodiment of the present invention. As shown in this drawing, the online print ordering system includes a web server 20 for connecting to customers' computers 10 over the Internet, storing order information, examining the order information and providing information about the state of reception over the Internet; and an application server 30 for placing relevant composition files on an imposition plate when there is order information, the reception of which is completed by the web server 20.

Figure 2:
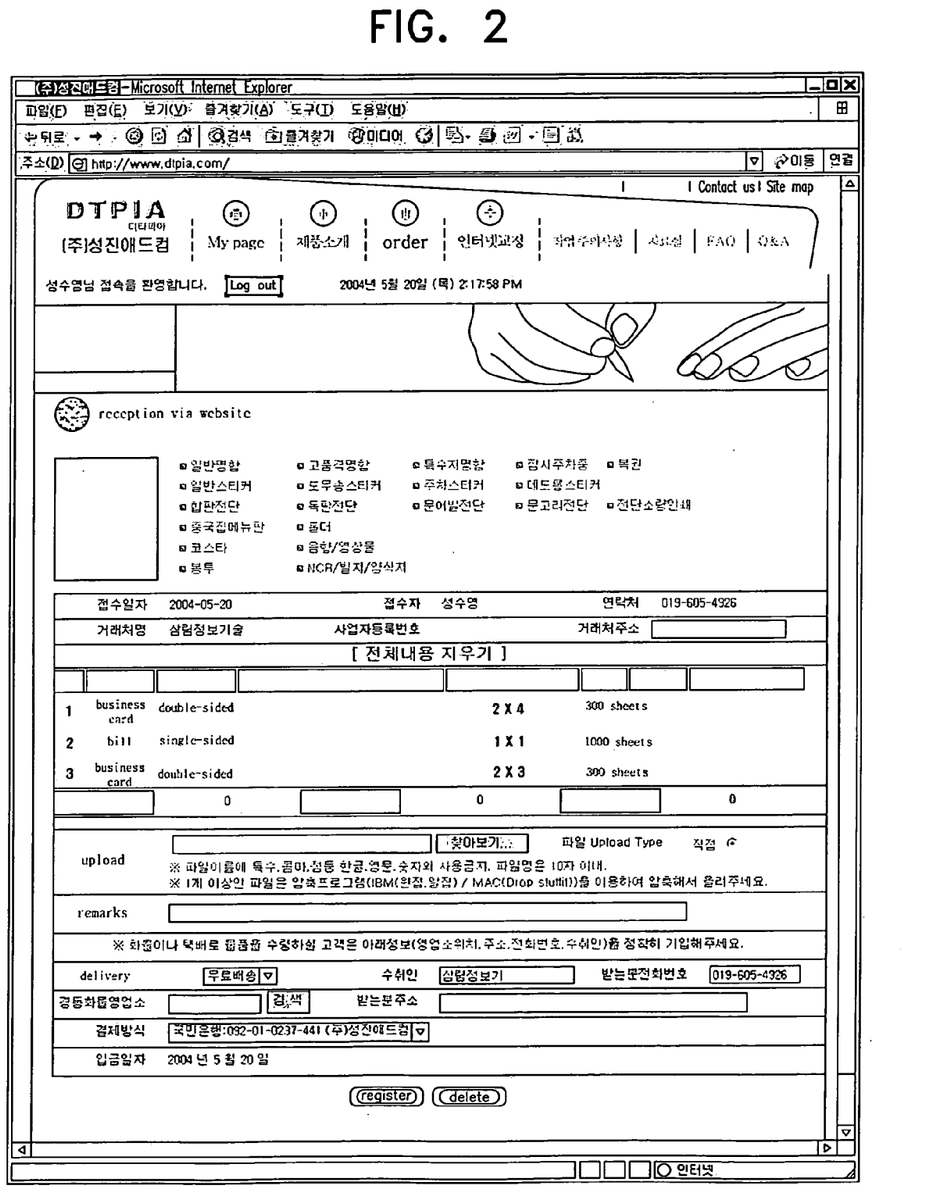
FIG. 2 is a diagram showing an example of a reception screen provided to a customer's computer according to the present invention.

The order information is entered through a reception screen (see FIG. 2) that is provided by the web server 20 to a customer's computer 10. The order information includes information indicative of the image file of prints and the types of prints (a business card, a bill, etc.) for respective print entities included in the image file, information indicative of the material of paper on which printing is to be performed, information indicative of whether post-processing, such as cutting to form a special shape after printing, is to be performed or not, and information indicative of whether printing is to be performed on one side or both sides of paper.

Figure 3:
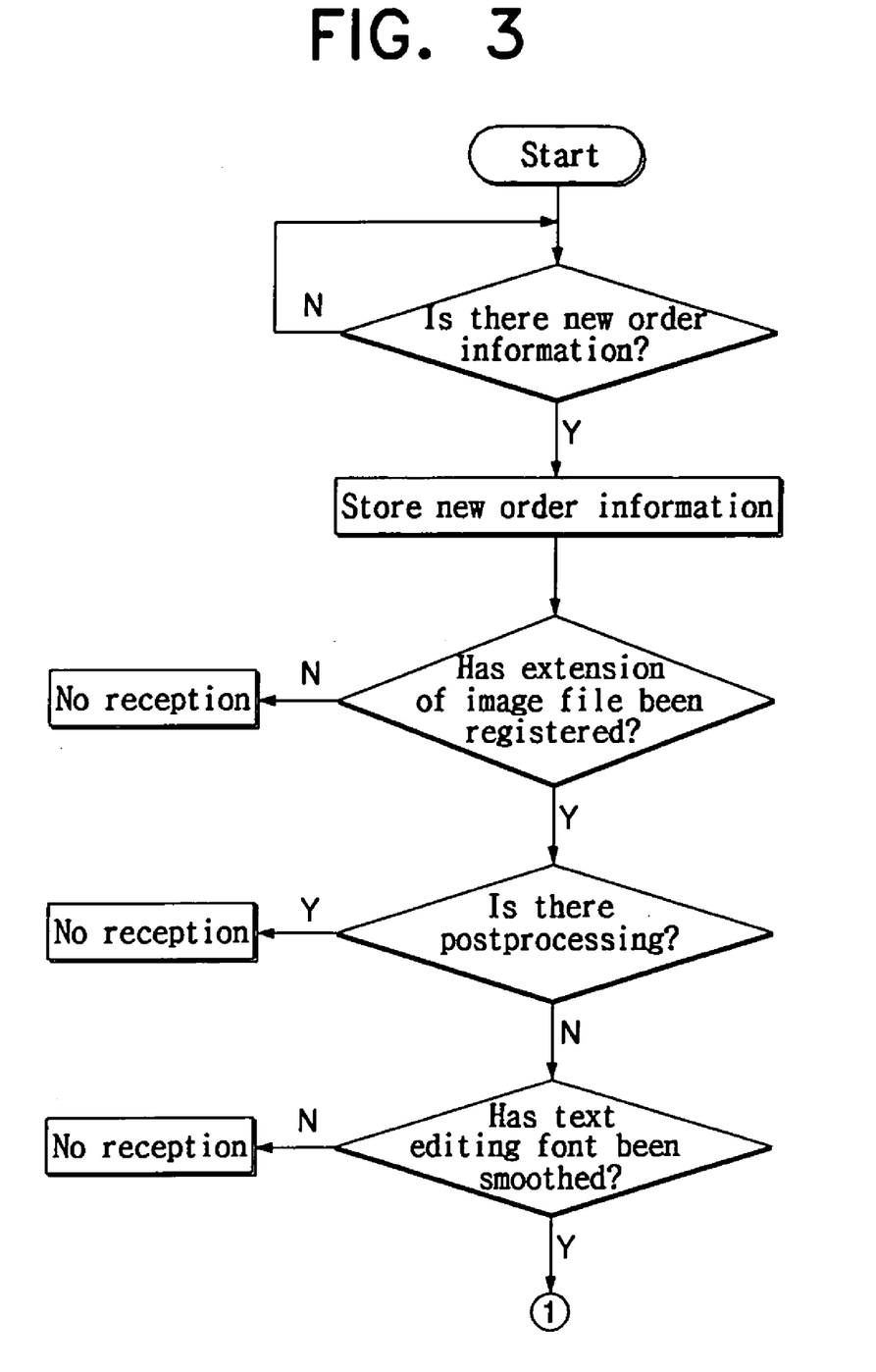
FIG. 3 is a flowchart showing a process up to step 1 of determining that information in question is automatically receivable order information according to the present invention.
Figure 4:
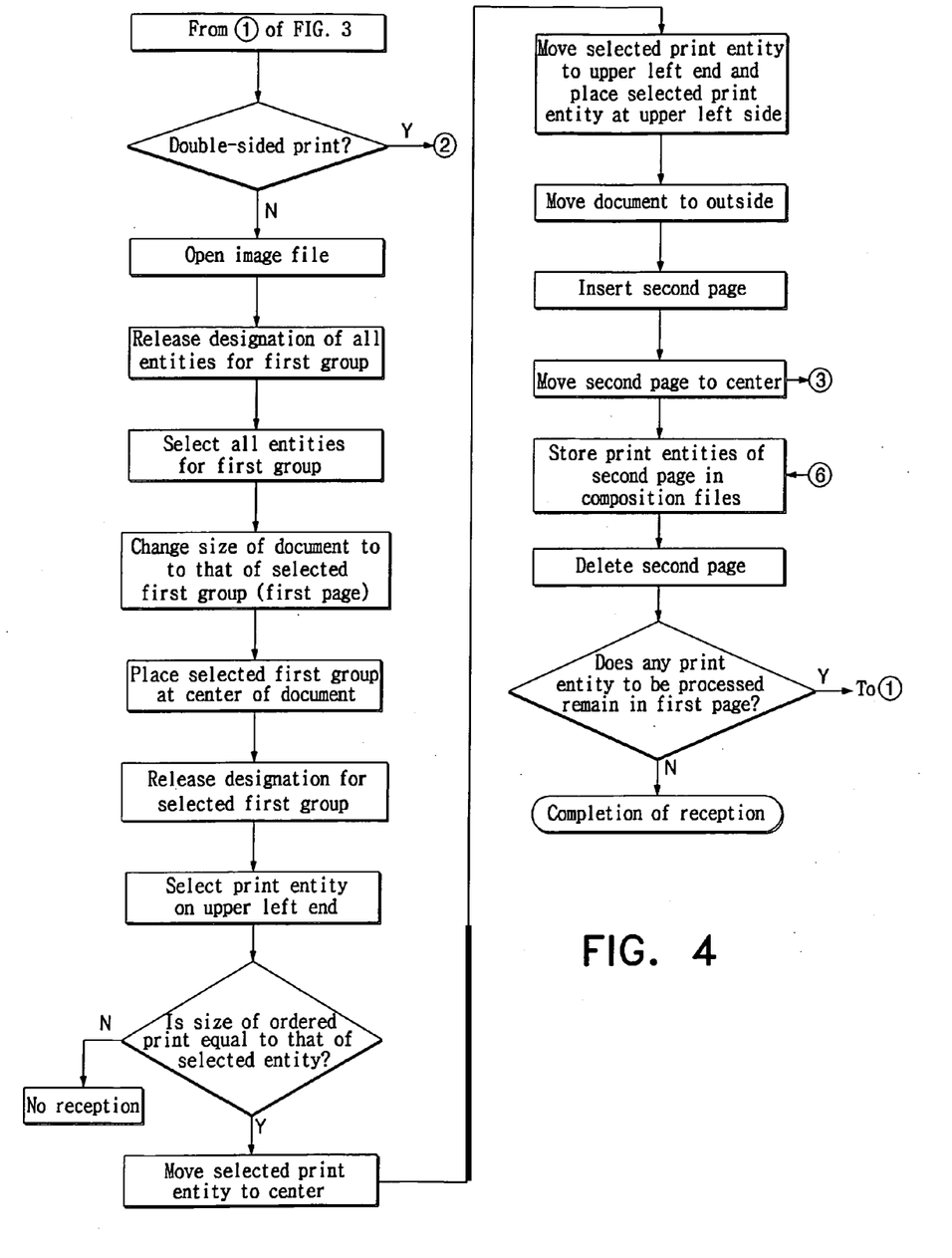
FIG. 4 is a flowchart showing a process of automatically receiving single-sided print order information according to the present invention.
Figure 5:
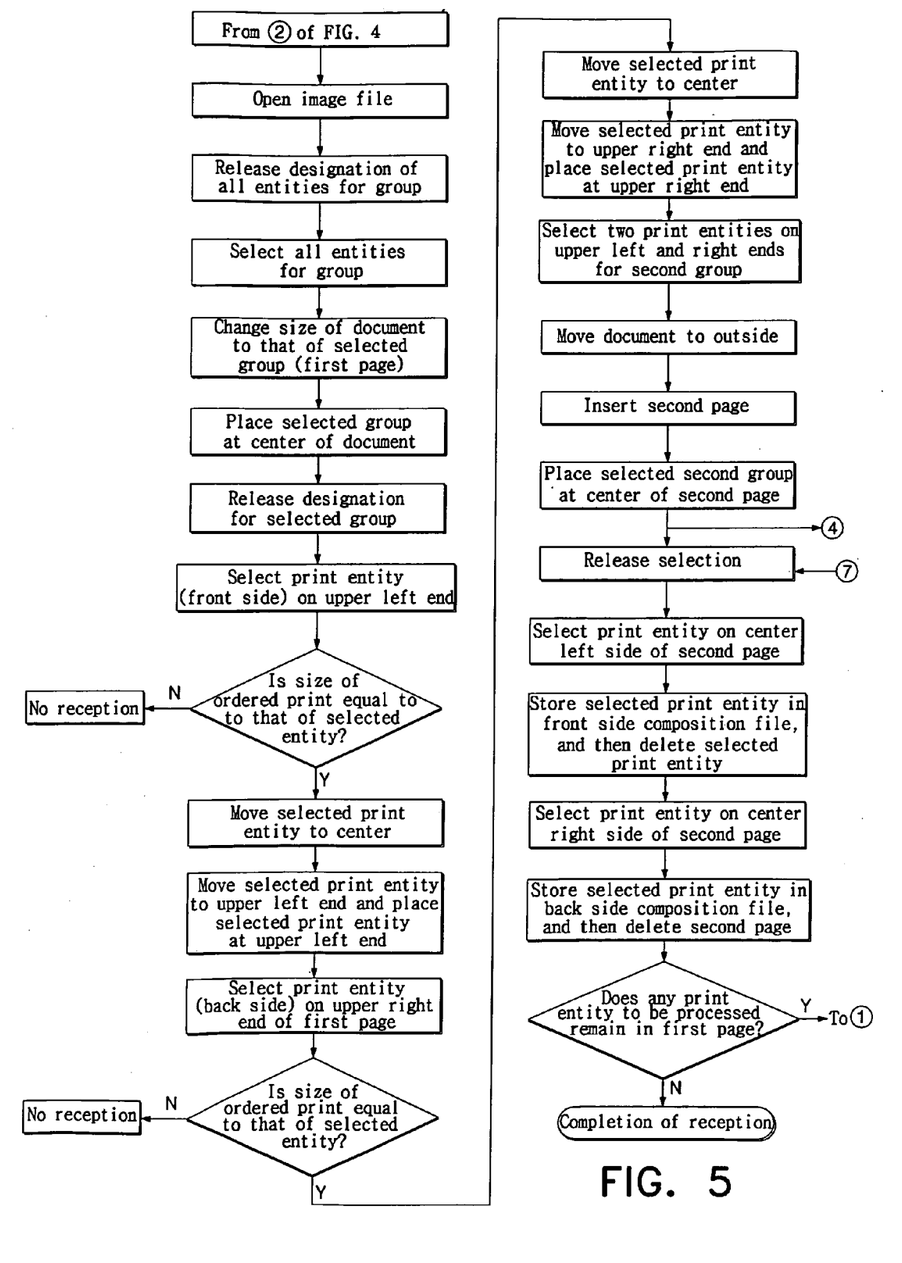
FIG. 5 is a flowchart showing a process of automatically receiving double-sided print order information according to the present invention.

FIGS. 3 to 5 are flowcharts illustrating a reception method, performed in the web server 20, in steps. As illustrated in these drawings, the reception method includes a preliminary reception step of storing new order information when there is new order information; step 1 of, if an image file, included in the stored order information, has a registered extension, an item related to postprocessing is not included in the order information and the text editing font of the image file has been smoothed, determining that the order information stored at the preliminary reception step is automatically receivable order information; step 2 of determining whether a print entity to be selected from among print entities included in the image file is related to a double-sided print; step 3 of running a program corresponding to the extension of the image file, opening the image file in a first page, releasing the group designation of all entities, selecting all the entities for a first group 110, changing the size of a first document 200 to that of the selected first group 110, and placing the first document 200 at the center thereof; step 4 of releasing the designation for the first group 110, selecting a print entity 100 on the upper left side of a second document 210, and determining whether the size of the second document 210 is equal to that of an ordered print; step 5-1 of, if the print entity 100 is determined to be related to a single-sided print at step 3 and the size of the selected print entity 100 is equal to that of an ordered print, placing the print entity 100, selected at step 4, at the center of a newly inserted second page, storing the print entity 100 in a composition file, and deleting the second page; step 5-2 of, if the selected print entity 100 is determined to be related to a double-sided print at step 3 and the size of the selected print entity 100 is equal to that of the ordered print, placing the print entity 100, selected at step 4, in the upper left corner of the second document 210, selecting a print entity 101 on the upper right side of the second document 210, placing the print entity 210 on the upper right corner of the second document 210, placing a second group 111, for which the two double-sided print entities 100 and 101, placed at the upper end of the second document 210, are selected, at the center of a newly inserted second page, and storing the left print entity 100 in a front side composition file and the right print entity 101 in a back side composition file and, simultaneously, deleting the second page; and step 6 of, if any print entity to be processed remains in the first page, repeating step 2 and steps subsequent thereto, and, when all of the print entities in the first page are stored in composition files, providing a reception completion notice to a relevant customer's computer over the Internet.

At the preliminary reception step, the order information, provided by the customer's computer 10 over the Internet, is stored without the determination of whether a related order is a normal order or not.

The image file is created by the customer's computer 10, and the web server 20 determines whether the image file has been created using a registered program, which can be run by itself, by searching for the extension of the image file. If it is determined that the extension of the image file indicates that the image file has been created using an unregistered program, the order in question is processed as an order that cannot be processed in the online print ordering system.

If the extension of the image file has been registered, whether the order in question is an order requiring postprocessing is determined. If the order in question is an order requiring postprocessing, the order information is provided to a receptionist computer 40 so that the order information can be received through manual work.

If the order in question is a print order requiring postprocessing, whether a text editing font has been smoothed is determined. If the text editing font has not been smoothed, the receptionist computer 40 performs smoothing work using a relevant program, and then provides new order information to the web server 20. The smoothing work refers to the designation of a font value that is performed in order to prevent the phenomenon in which text is broken at the time of text editing of an image file.

If the extension of the image file has not been registered, postprocessing is required and the image file has not been smoothed, the web server 20 notifies the receptionist computer 40 and the customer's computer 10 of a non-reception state, and provides information about the reason for no-reception as detailed information.

The 'double-sided print' of step 2 refers to a print in which printing is performed on front and back sides. A print, other than a double-sided print, is a single-sided print in which printing is performed on front sides. In this case, a customer places the print entity 100 within a specific range from the left 는image file에 print entity들을 in the case of a front side print. In the case of a double-sided print, the front side print entity 100 must be placed within a specific range from the left end of the first document 200, and the back side print entity 101 must be placed within a specific range from the right end of the first document 200 on the right side of the front side print entity 100.

Figure 6:
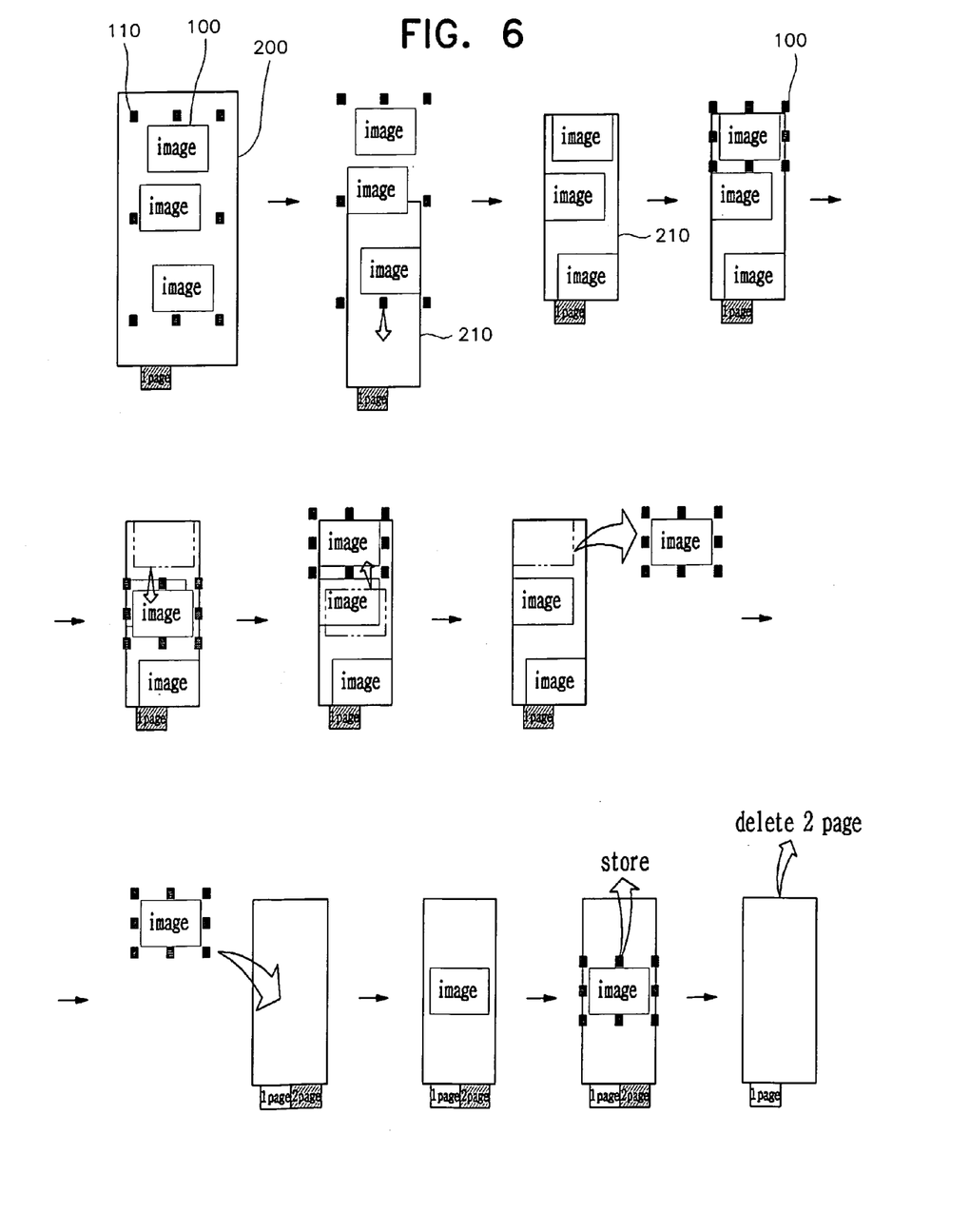
FIG. 6 is a diagram showing a process in which, in the case in which print entities included in the order information of the present invention correspond to single-sided prints, the print entities are stored in composition files.
Figure 7:
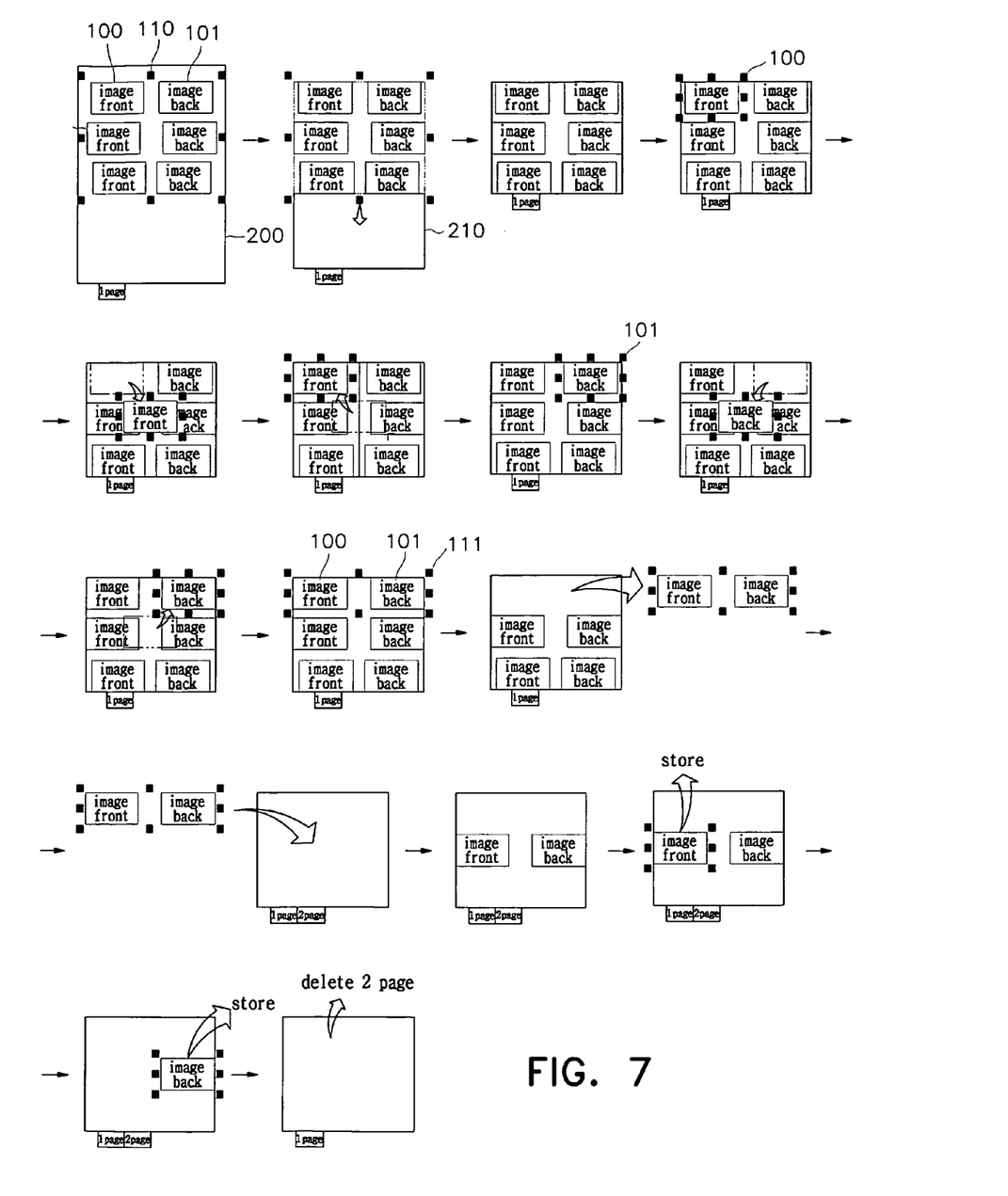
FIG. 7 is a diagram showing a process in which, in the case in which print entities included in the order information of the present invention correspond to double-sided prints, the print entities are stored in composition files.

The web server 10 is provided with a tool for running an image file creation program (CorelDraw, Quark, AI, JPG, or the like) corresponding to a registered extension, creating composition files and storing the composition files. FIG. 6 is a diagram showing an automatic reception process in the case of single-sided print order information, and FIG. 7 is a diagram showing an automatic reception process in the case of double-sided print order information.

The second document 210, changed at step 4, has a minimal size in which all of the selected print entities can be accommodated. The size of the second document 210 is the same as that of the first group 110.

In the case of a single-sided print, if the size of the selected print entity 100 is not equal to that of the print item designated in the order information, the customer's computer 10 is notified of a non-reception state over the Internet and the reason for the non-reception state is provided as detailed information.

If the two pieces of size information are consistent with each other, the selected print entity 100 is placed at the center of the first page of the second document 210, is placed in the upper left corner of the second document 210, and is then moved outside the second document 210. A second page is inserted behind the first page, the print entity 100 is placed at the center of the second page and is stored in a composition file, and the second page is deleted.

The reason for placing the print entity 130 at the center is to accurately place the print entity 130 in the upper left corner of the second document 210.

FIG. 7 is a diagram showing a process of storing print entities in composition files in the case of a double-sided print. If two pieces of size information are consistent with each other, a front side print entity 100 at the upper left end of a selected second document 210 is selected, placed at the center of the first page of the second document 210, and placed in the upper left corner of the second document 210, and a back side print entity 101 at the upper right end is selected, placed at the center of the first page of the second document 210, and placed in the upper right corner of the second document 210.

The reason for placing the front side print entity 100 and the back side print entity 101 in the upper end of the second document 210 is to process the two entities 100 and 101 as front and back side composition files for the same print.

A second group 111, created by selecting the two print entities 100 and 101, is placed at the center of a newly inserted second page, the left print entity 100 and the right print entity 101 are respectively stored in a front side composition file and a back side composition file, and the second page is deleted.

Figure 8:
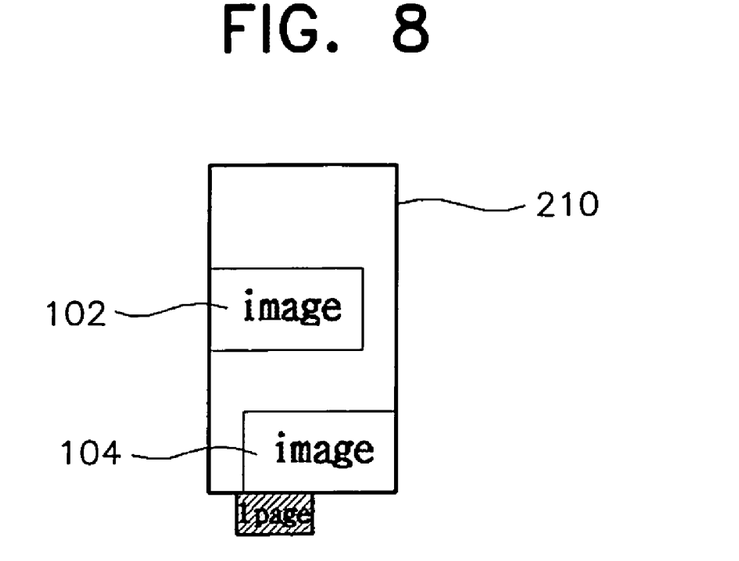
FIG. 8 is a diagram showing print entities remaining in the first page of a document after one print order has been processed into composition files through the process of FIG. 6.
Figure 9:
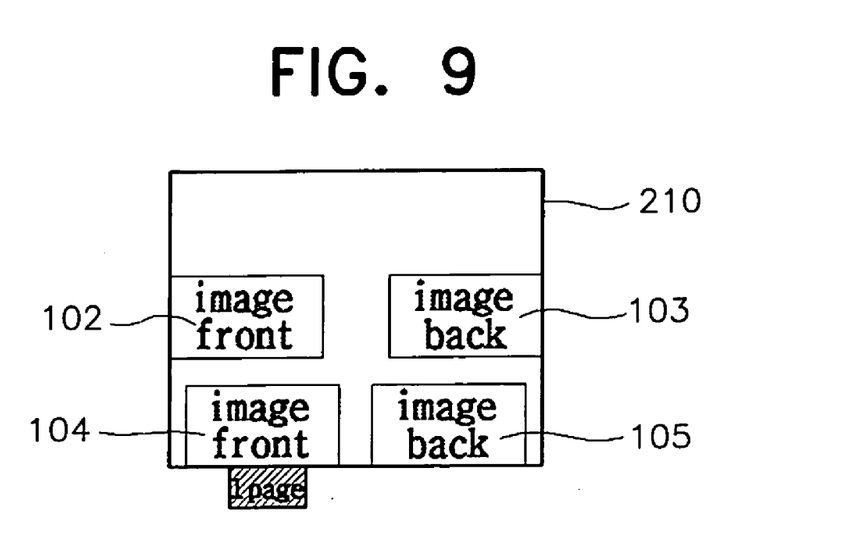
FIG. 9 is a diagram showing print entities remaining in the first page of a document after one print order has been processed into composition files through the process of FIG. 7.

FIGS. 8 and 9 are diagrams showing print entities that remain in the first page of the first document 200 after one print order has been processed into composition files through the steps shown in FIGS. 6 and 7. A process of storing print entities of the first page, which have not been processed, in composition files through step 3 and steps subsequent thereto is repeated until no print entity to be processed remains in the first page.

Figure 10:
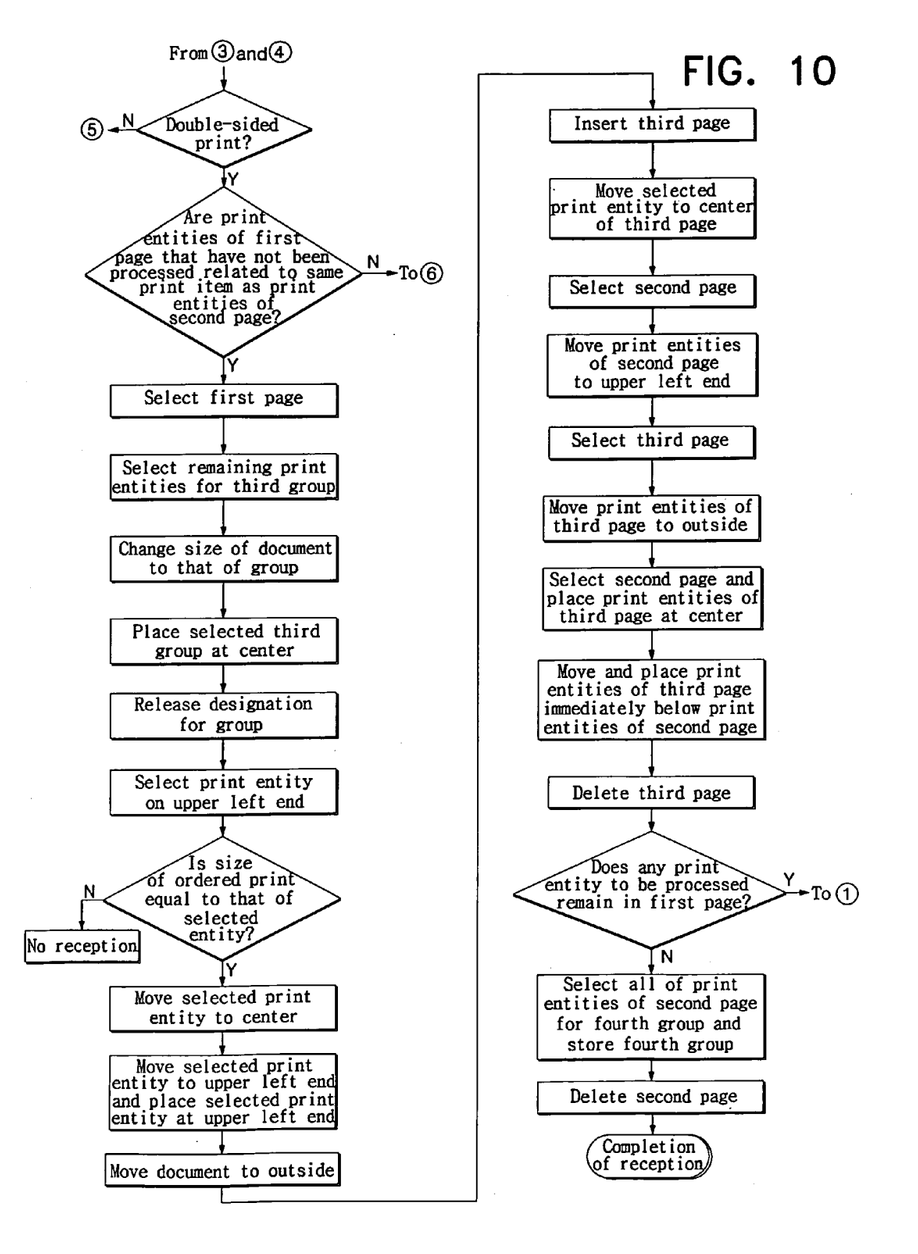
FIG. 10 is a flowchart showing a process of automatically receiving order information in the case in which print entities, which are included in the order information and correspond to the same print item, are related to single-sided prints.
Figure 11:
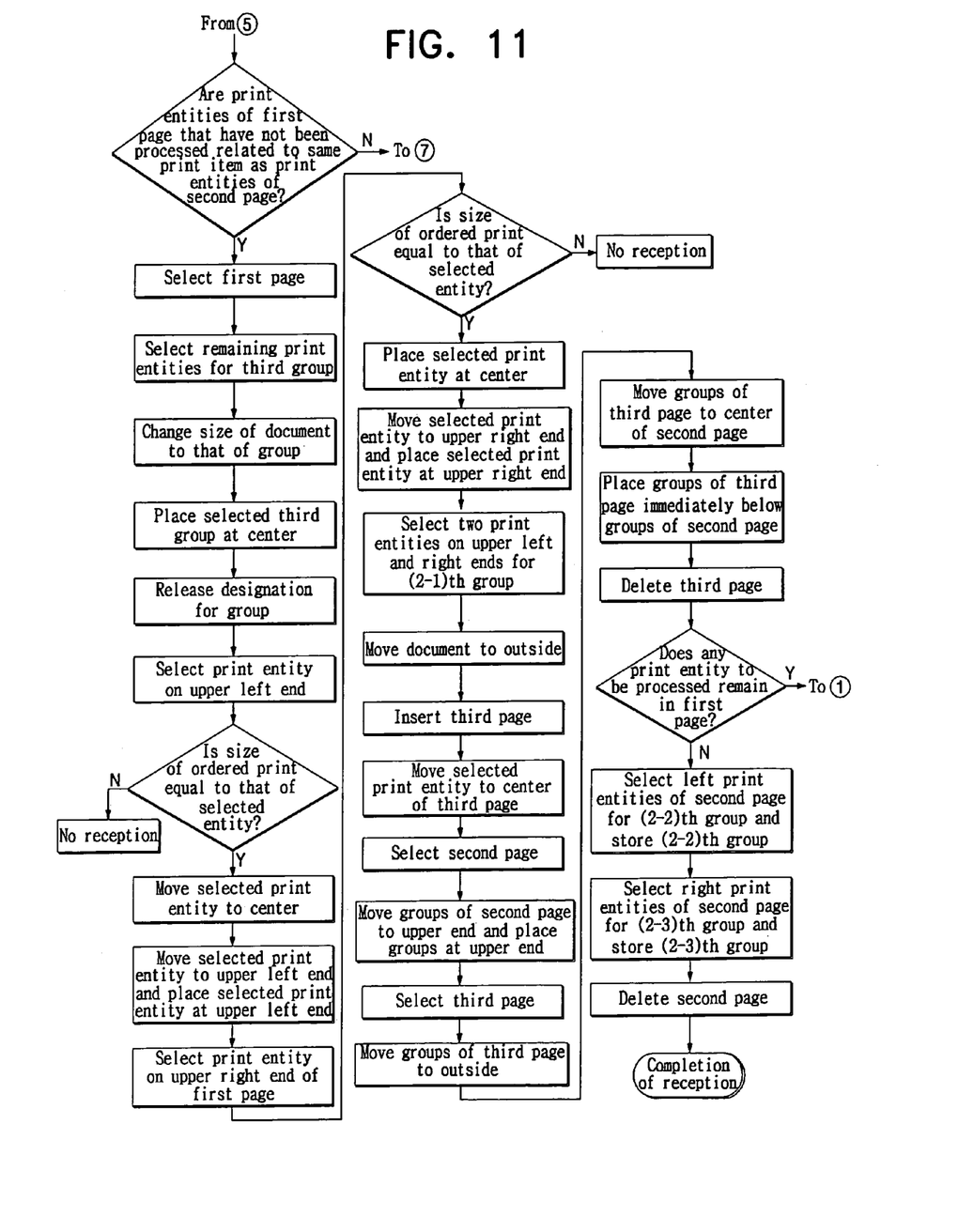
FIG. 11 is a flowchart showing a process of automatically receiving order information in the case in which print entities, which are included in the order information and correspond to the same print item, are related to double-sided prints.

FIGS. 10 and 11 are other embodiments of the present invention. These drawings are provided to illustrate a process that can be added in order to perform more efficient composition work in the case in which print entities arranged in an image file correspond to the same print item.

As shown in the drawings, the process further includes step 3-1 of, if the print entities 100 and 101, placed at the center of the second page at steps 5-1 and 5-2, correspond to the same print item as the print entities 102 and 103 remaining in the first page, selecting all of the remaining print entities for a third group 112 by selecting the first page, changing the size of the second document 210 to that of the third group 112, and placing the third group 112 at the center; step 4-1 of releasing the designation for the third group 112, selecting the print entity 102 on the upper left side of the third document 220, and determining whether the size of the print entity 102 is equal to that of the ordered print; step 5-3 of, if the selected print entity 102 is related a single-sided print and the size of the selected print entity 102 is equal to that of the ordered print, placing the print entity 102, selected at step 4-1, at the center of a newly inserted third page, selecting the print entity 100 of the second page, placing the print entity 100 at the upper end of the third document 220, and placing the print entity 102 of the third page immediately below the print entity 100 of the second page and, simultaneously, deleting the third page, and, if no print entity to be processed remains in the first page, selecting the print entities 100 and 102 of the second page for a fourth group 113, and storing the print entities 100 and 102 in a composition file and, simultaneously, deleting the second page; step 5-4 of, if the selected print entities 100 and 102 are related to a double-sided print and the size of the selected print entity 102 is equal to that of the ordered print, placing the print entity 102, selected at step 4-1, in the upper left corner of the third document 220, selecting the print entity 103 on the upper right side of the third document 220, placing the print entity 103 in the upper right corner of the third document 220, placing a (2-1)th group 114, for which the two double-sided print entities 102 and 103, placed at the upper end of the third document 220, are selected, at the center of the newly inserted third page, selecting the second group 111 of the second page, placing the second group 111 at the upper end of the third document 220, and placing the (2-1)th group 114 of the third page immediately below the second group 111 of the second page and, simultaneously, deleting the third page, and, if no print entity remains in the first page or remaining print entities 104 and 105 are related to a different print item, selecting the left print entities 100 and 102 for a (2-2)th group 115 and storing the print entities 100 and 102 in a front side composition file, selecting right print entities 101 and 103 for a (2-3)th group 116 and storing the selected print entities 101 and 103 in a back side composition file, and, simultaneously, deleting the second page; and step 6-1 of, if print entities 104 and 105 to be processed remain in the first page, repeating step 2 and steps subsequent thereto, and, if all the print entities of the first page are stored in composition files, providing a reception completion notice to the customer's computer 10.

Prints corresponding to the same print item refer to prints that can be processed on the same plate because the conditions thereof, such as the sizes, the materials of paper, and, and double-sided prints or single-sided prints, are the same.

Steps 3-1 and 4-1 are substantially the same as steps 3 and 4 except that steps 3-1 and 4-1 are performed before the print entities 100 and 101 of the second page are stored in composition files.

Figure 12:
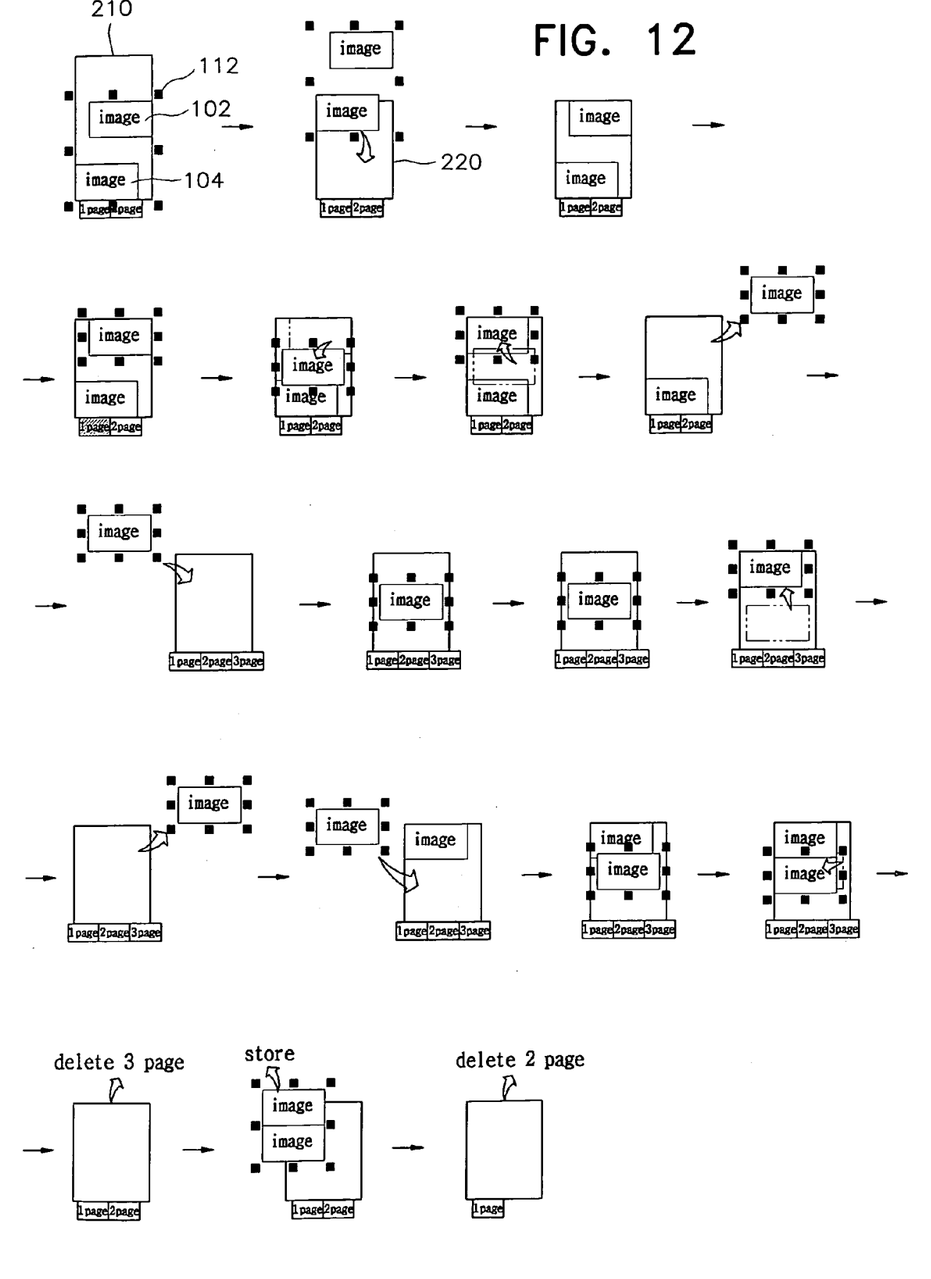
FIG. 12 is a diagram showing the automatic reception process of FIG. 10.

Step 5-3 (see FIG. 12) enables the following printing steps to be performed at the same time by allowing prints to be processed on the same imposition plate in the case in which prints corresponding to the same print item are included in the same order information in such a way as to, in the state in which the print entity 100 of the second page is not stored in a composition file at step 5-1, select a print entity on the upper left side from among the remaining print entities 102 of the first page, place the selected print entity on the third page, place the print entity 100 of the second page at the upper end, place the print entity 102 of the third page below the print entity 100 of the second page, and store the print entities 100 and 102 in a single composition file. The simultaneous performance of the printing steps results in a reduction in the logistic cost because a process of moving prints out of a print shop and then delivering them to a customer can be performed at the same time.

Figure 13:
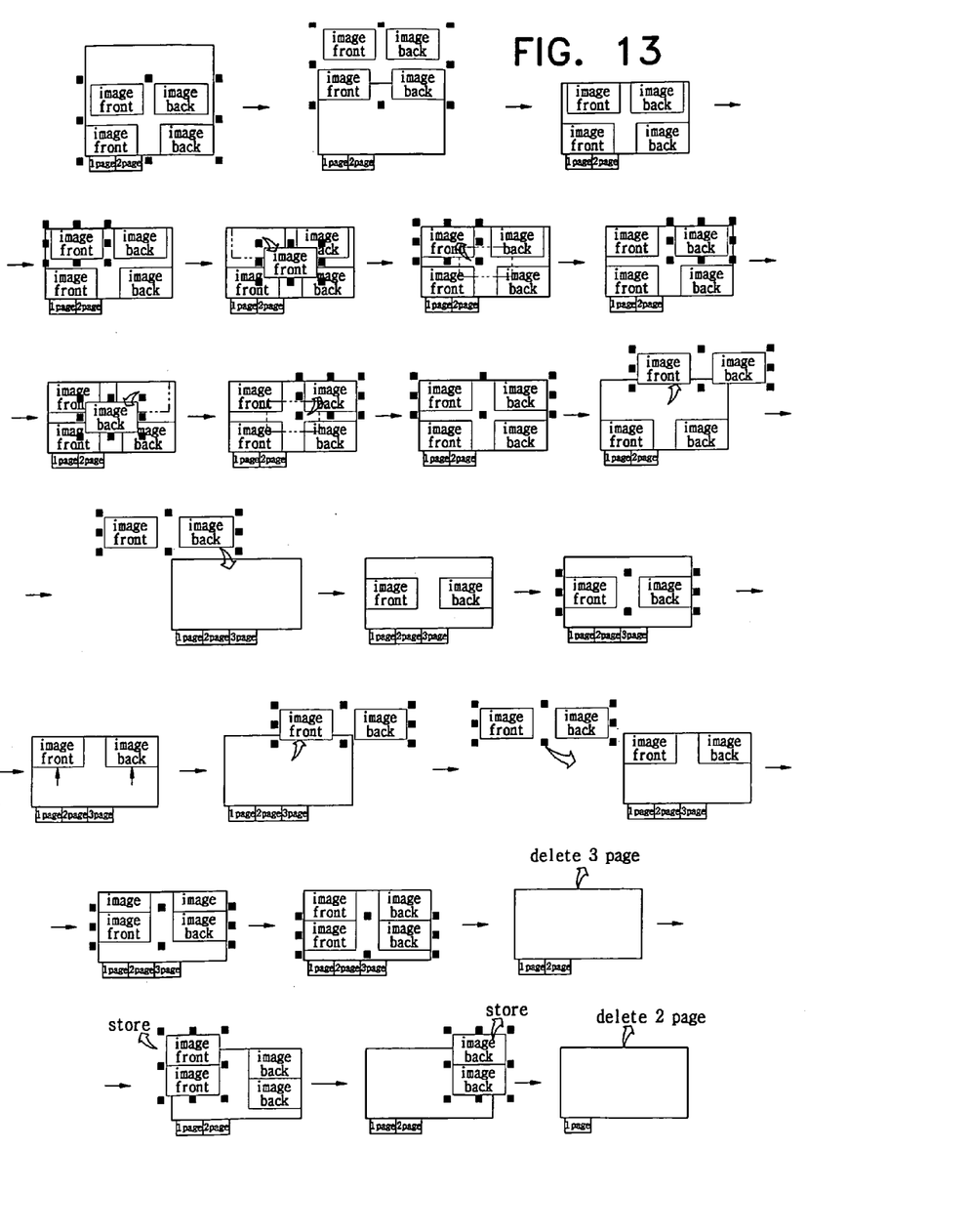
FIG. 13 is a diagram showing the automatic reception process of FIG. 11.

Step 5-4 (see FIG. 13) is substantially the same as step 5-2 except that, in the state in which the second group 111 is not stored in composition files, the (2-1)th group 114 remaining in the first page is placed below the second group 111, and the (2-1)th group 114 is selected for a (2-2)th group 115 and a (2-3)th group 116 and stored in front and back side composition files. Step 5-4 is the same as step 5-3 in that step 5-4 is a process for enabling composition to be performed in the same imposition plate in the case in which prints corresponding to the same print item are included in the same order information.

When money is received after all of the print entities of the image file have been stored in composition files through the above-described steps, the composition work of arranging the composition files on a layout sheet is performed.

The present invention, constructed as described above, has advantages in that the case in which a single image file includes various types of print entities is determined to be normal and then composition files are enabled to be created for the respective entities, thereby improving the efficiency of the print ordering system and customers' convenience of use.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A reception method for an online print ordering system, comprising:
    a preliminary reception step of storing new order information when there is new order information;
    step 1 of, if an image file, included in the stored order information, has a registered extension, an item related to postprocessing is not included in the order information and the text editing font of the image file has been smoothed, determining that the order information stored at the preliminary reception step is automatically receivable order information;
    step 2 of determining whether a print entity to be selected from among print entities included in the image file is related to a double-sided print;
    step 3 of running a program corresponding to the extension of the image file, opening the image file in a first page, releasing group designation of all entities, selecting all the entities for a first group, changing a size of a first document to that of the selected first group, and placing the first document at the center thereof;
    step 4 of releasing the designation for the first group, selecting a print entity on an upper left side of a second document, and determining whether a size of the second document is equal to that of an ordered print;
    step 5-1 of, if the print entity is determined to be related to a single-sided print at step 3 and a size of the selected print entity is equal to that of an ordered print, placing the print entity, selected at step 4, at a center of a newly inserted second page, storing the print entity in a composition file, and deleting the second page;
    step 5-2 of, if the selected print entity is determined to be related to a double-sided print at step 3 and the size of the selected print entity is equal to that of the ordered print, placing the print entity, selected at step 4, in an upper left corner of the second document, selecting a print entity (101) on an upper right side of the second document, placing the print entity on an upper right corner of the second document, placing a second group, for which the two double-sided print entities, placed at the upper end of the second document, are selected, at a center of a newly inserted second page, and storing the left print entity in a front side composition file and the right print entity in a back side composition file and, simultaneously, deleting the second page; and
    step 6 of, if any print entity to be processed remains in the first page, repeating step 2 and steps subsequent thereto, and, when all of the print entities of the first page are stored in composition files, providing a reception completion notice to a relevant customer's computer over an Internet.

2. The reception method as set forth in claim 1, further comprising:
    step 3-1 of, if the print entities, placed at the center of the second page at steps 5-1 and 5-2, correspond to a print item identical to that of the print entities remaining in the first page, selecting all of the remaining print entities for a third group by selecting the first page, changing a size of the second document to that of the third group, and placing the third group at the center thereof;
    step 4-1 of releasing designation for the third group, selecting the print entity on an upper left side of the third document, and determining whether a size of the print entity is equal to that of the ordered print;
    step 5-3 of, if the selected print entity is related to a single-sided print and a size of the selected print entity is equal to that of the ordered print, placing the print entity, selected at step 4-1, at a center of a newly inserted third page, selecting the print entity of the second page, placing the print entity at an upper end of the third document, and placing the print entity of the third page immediately below the print entity of the second page and, simultaneously, deleting the third page, and, if no print entity to be processed remains in the first page, selecting the print entities of the second page for a fourth group, and storing the print entities in a composition file and, simultaneously, deleting the second page;
    step 5-4 of, if the selected print entities are related to a double-sided print and the size of the selected print entity is equal to that of the ordered print, placing the print entity, selected at step 4-1, in an upper left corner of the third document, selecting the print entity on an upper right side of the third document, placing the print entity in an upper right corner of the third document, placing a (2-1)th group, for which the two double-sided print entities, placed at the upper end of the third document, are selected, at the center of the newly inserted third page, selecting the second group of the second page, placing the second group at the upper end of the third document, and placing the (2-1)th group of the third page immediately below the second group of the second page and, simultaneously, deleting the third page, and, if no print entity remains in the first page or remaining print entities are related to a different print item, selecting the left print entities for a (2-2)th group and storing the print entities in a front side composition file, selecting right print entities for a (2-3)th group and storing the selected print entities in a back side composition file, and, simultaneously, deleting the second page; and step 6-1 of, if print entities to be processed remain in the first page, repeating step 2 and steps subsequent thereto, and, if all the print entities of the first page are stored in composition files, providing a reception completion notice to the customer's computer.

\* \* \* \* \*